US009489389B2

(12) United States Patent
Patil et al.

(10) Patent No.: US 9,489,389 B2
(45) Date of Patent: Nov. 8, 2016

(54) SYSTEM AND METHOD FOR MAINTAINING CACHE COHERENCY

(71) Applicant: PernixData, Inc., San Jose, CA (US)

(72) Inventors: Kaustubh Sambhaji Patil, Sunnyvale, CA (US); Murali Natarajan Vilayannur, San Jose, CA (US); Satyam B. Vaghani, San Jose, CA (US); Michal Ostrowski, Cedar Park, TX (US); Woon Ho Jung, Cupertino, CA (US); Poojan Kumar, San Jose, CA (US)

(73) Assignee: PernixData, Inc., San Jose, CA (US)

( * ) Notice: Subject to any disclaimer, the term of this patent is extended or adjusted under 35 U.S.C. 154(b) by 107 days.

(21) Appl. No.: 14/101,219

(22) Filed: Dec. 9, 2013

(65) Prior Publication Data

US 2015/0161048 A1 Jun. 11, 2015

(51) Int. Cl.

*G06F 12/00* (2006.01)
*G06F 17/30* (2006.01)
*G06F 12/08* (2016.01)

(52) U.S. Cl.

CPC ..... *G06F 17/30132* (2013.01); *G06F 12/0871* (2013.01); *G06F 2212/1016* (2013.01); *G06F 2212/465* (2013.01); *G06F 2212/466* (2013.01)

(58) Field of Classification Search

None

See application file for complete search history.

(56) References Cited

U.S. PATENT DOCUMENTS

| | | | | |
|---|---|---|---|---|
| 6,351,754 | B1 * | 2/2002 | Bridge, Jr. | G06F 11/1461 |
| 6,453,354 | B1 * | 9/2002 | Jiang | G06F 17/30171 707/E17.01 |
| 7,856,530 | B1 * | 12/2010 | Mu | G06F 12/0888 711/119 |
| 9,026,736 | B1 * | 5/2015 | Venkat | G06F 12/0877 711/113 |
| 2011/0296133 | A1 * | 12/2011 | Flynn | G06F 11/1048 711/171 |

OTHER PUBLICATIONS

Cheong et.al. "A Version Control Approach to Cache Coherence" 1989 ACM.*

* cited by examiner

*Primary Examiner* — Midys Rojas
*Assistant Examiner* — Tasnima Matin
(74) *Attorney, Agent, or Firm* — Gard & Kaslow LLP

(57) ABSTRACT

A cache manager maintains coherency of cached objects used by applications in a computing system. The cache manager maintains a cache memory of objects as they are accessed by an application. The cache manager tracks cached objects on a per-application basis using a cache database, storing for each object metadata comprising the generation number of the application using the cached object, and the file generation number of the file from which the object was read. The cache manager determines whether cached objects are valid and can be used by the application, or are stale and must be reloaded, by using these generation numbers when an application attempts to use a file or object. In this fashion, cache coherency is maintained even in a distributed environment without the centralized cache management bottlenecks of prior approaches and without the need to eagerly purge the cache of stale versions of objects.

18 Claims, 8 Drawing Sheets

200
Intercept read req from app
210
Determine req obj id and req gen num
220
Req obj in cache memory ?
230
YES
NO
Stored obj gen < req gen num ?
270
YES
NO
Store copy of req obj from storage in cache memory and add to cache db
240
Add ref to stored obj to app list
250
Return obj to app
260

App
150a
App
150b
Cache Manager
160a
Cache DB
165a
OS
140a
Memory 130a
Cache Memory
170a
172a
Processor
110a
Computing
System
100a
Distributed
System
800
810
App
150c
App
150d
Cache Manager
160b
Cache DB
165b
OS
140b
Memory 130b
Cache Memory
170b
172b
Processor
110b
Computing
System
100b
122
124
File Store
820

SYSTEM AND METHOD FOR MAINTAINING CACHE COHERENCY

BACKGROUND OF THE INVENTION

1. Field of the Invention

The present invention relates generally to cache management in computing systems, and more particularly, to maintaining cache coherency in a computing environment such as a distributed computing environment.

2. Description of the Prior Art

In computing systems, a cache is a memory system or subsystem which transparently stores data so that future requests for that data can be served faster. As an example, many modern microprocessors incorporate an instruction cache holding a number of instructions; when the microprocessor executes a program loop where the same set of instructions are executed repeatedly, these instructions are fetched from the instruction cache, rather than from an external memory device at a performance penalty of an order of magnitude or more.

Similarly, most modern operating systems cache disk objects for re-use. When an application program reads a file from a disk, the file contents are stored as one or more objects in a cache memory so that a subsequent request for that file can be fulfilled from the cache, which will be much faster than reading the file once more from the disk. It is to be understood herein that an object is a disk file, a portion of a disk file, a data object stored on an object storage system, or other contents of a storage device, a disk drive or other storage media.

As is known in the art, a cache manager, for example for disk operations, intercepts input/output (I/O) requests to the disk. When the cache manager receives a read request from a client such as an application program, the cache manager determines if the required object is stored in the cache, and returns that object to the client if it is stored in the cache; this is known as a cache hit. If the required object is not stored in the cache, this is known as a cache miss; the object is read from the disk, the cache manager places a copy of the object in the cache, and returns the object to the client.

Issues arise with multiple applications making use of the same data, and with multiple distributed caches serving multiple applications. The issue is known as cache coherency, and deals with the fundamental question regarding whether a given copy of an object in a cache is valid. If the copy of the object in the cache is the same as the object on the storage device, then the copy of the object in the cache is valid and can be used. Conversely, if the object on the storage device has been modified since the copy of the object in the cache was made or stored, then the copy of the object in the cache is not valid and cannot be used; it is considered stale. The first issue then is identifying that an object in the cache is stale. When a stale cache object is identified, the second issue is that the object must be retrieved again from the storage device at a substantial performance penalty, compared to retrieval from the cache.

In other environments, such as where a computing system hosts multiple virtual machines under the control of a hypervisor, with each virtual machine running one or more programs, caching of objects stored on a network attached storage system can provide significant performance improvements. This presumes, however, that cache coherency issues can scale with the workload.

These cache coherency issues increase in a distributed computing environment, with multiple computing systems, each hosting multiple virtual machines, each seeking to cache content from a shared network attached storage system. In such a distributed computing environment, without caching, the performance of the shared network attached storage system becomes a performance bottleneck. Caching can alleviate this bottleneck, but using a centralized cache management strategy, in which all cache accesses must be checked by a centralized cache manager, replaces one bottleneck with another, and introduces another single point of failure into the distributed environment.

What is needed is a method to manage cache coherency in a computing environment and particularly in a manner which can scale with the requirements of a distributed computing environment, without introducing performance bottlenecks.

SUMMARY

In an embodiment is a computing system having a cache memory and a storage device, a cache coherency method comprising: intercepting, by a cache manager running on the computing system, a read request from an application running on the computing system; determining, by the cache manager from the intercepted read request, an identifier for a required object and a required generation number; and determining by the cache manager: if the required object is not stored in the cache memory, then storing in the cache memory a copy of the required object retrieved from the storage device, adding metadata regarding the stored object to the cache database, the stored object metadata comprising an object generation number equal to the application generation number, adding a reference to the stored object to a list of references to objects stored in the cache memory that are being used by the application, and returning the copy of the object to the application, else if the required object is stored in the cache memory, and the stored object is of a generation number that is not less than the required generation number, then adding a reference to the stored object to the list of objects stored in the cache memory that are being used by the application, and returning the stored object from the cache memory to the application, else if the required object is stored in the cache memory, and the stored object is of a generation number that is less than the required generation number, then storing in the cache memory a copy of the required object retrieved from the storage device, adding metadata regarding the stored object to the cache database, the stored object metadata comprising an object generation number equal to the application generation number, adding a reference to the stored object to a list of references to objects stored in the cache memory that are being used by the application, and returning the copy of the object to the application.

In a further embodiment, the cache coherency method wherein adding metadata regarding the stored object to the cache database further comprises adding file system metadata about a file containing the stored object, the file system metadata comprising a file identifier and a file generation number, and the method further comprising prior to the step of intercepting the read request: intercepting, by the cache manager running on the computing system, a file open request for a file object on the storage device from an application running on the computing system; obtaining, by the cache manager, a file open response containing a file identifier and a file generation number for the requested file object from the storage device, determining by the cache manager: if the list of references to objects stored in the cache memory that are being used by the application does not contain a reference to a cached object from the file object, then returning the file open response to the application, else if the file generation number contained in the file open response matches the file generation number stored as file system metadata for the cached object, then returning the file open response to the application, else incrementing the application generation number and returning the file open response to the application.

In a still further embodiment, the cache coherency method wherein adding metadata regarding the stored object to the cache database further comprises adding storage system metadata about a data object containing the stored object, the storage system metadata comprising a data object identifier and a data object generation number, and the method further comprising prior to the step of intercepting the read request: intercepting, by the cache manager running on the computing system, a data object access request for a data object on the storage device from an application running on the computing system; obtaining, by the cache manager, a data object access response containing a data object identifier and a data object generation number for the requested data object from the storage device, and determining by the cache manager: if the list of references to objects stored in the cache memory that are being used by the application does not contain a reference to a cached object from the data object, then returning the data object access response to the application, else if the data object generation number contained in the data object access response matches the cached data object generation number stored as data object metadata for the cached object, then returning the data object access response to the application, else incrementing the application generation number and returning the data object access response to the application.

In an embodiment is a system for maintaining cache coherency in a computing system comprising: a cache memory; a cache database; a storage device; and a cache manager running on the computing system, the cache manager configured to: intercept a read request from an application running on the computing system; determine from the intercepted read request an identifier for a required object and a required generation number; and determine: if the required object is not stored in the cache memory, then store in the cache memory a copy of the required object retrieved from the storage device, add metadata regarding the stored object to the cache database, the stored object metadata comprising an object generation number equal to the application generation number, add a reference to the stored object to a list of references to objects stored in the cache memory that are being used by the application, and return the copy of the object to the application, else if the required object is stored in the cache memory, and the stored object is of a generation number that is not less than the required generation number, then add a reference to the stored object to the list of references to objects stored in the cache memory that are being used by the application, and return the stored object from the cache memory to the application, else if the required object is stored in the cache memory, and the stored object is of a generation number that is less than the required generation number, then store in the cache memory a copy of the required object retrieved from the storage device, add metadata regarding the stored object to the cache database, the stored object metadata comprising an object generation number equal to the application generation number, add a reference to the stored object to the list of references to objects stored in the cache memory that are being used by the application, and return the copy of the object to the application.

In a further embodiment, the system for maintaining cache coherency in a computing system wherein the cache manager is configured to add metadata regarding the stored object to the cache database by being further configured to add file system metadata regarding the stored object to the cache database, the file system metadata comprising a file identifier and a file generation number; and wherein the cache manager is further configured to: before intercepting the read request, intercept a file open request for a file object on the storage device from an application running on the computing system; obtain a file open response containing a file identifier and a file generation number for the requested file object from the storage device, determine: if the list of references to objects stored in the cache memory that are being used by the application does not contain a reference to a cached object from the file object, then return the file open response to the application, else if the file generation number contained in the file open response matches the file generation number stored as file system metadata for the cached object, then return the file open response to the application, else increment the application generation number and return the file open response to the application.

In a still further embodiment, the system for maintaining cache coherency in a computing system wherein the cache manager is configured to add metadata regarding the stored object to the cache database by being further configured to add storage system metadata regarding the stored object to the cache database, the storage system metadata comprising a data object identifier and a data object generation number; and wherein the cache manager is further configured to: before intercepting the read request, intercept a data object access request for a data object on the storage device from the application running on the computing system; obtain a data object access response containing a data object identifier and a data object generation number for the requested data object from the storage device, and determine: if the list of references to objects stored in the cache memory that are being used by the application does not contain a reference to a cached object from the data object, then return the data object access response to the application, else if the data object generation number contained in the data object open response matches the data object generation number stored as storage system metadata for the cached object, then return the data object access response to the application, else increment the application generation number and return the data object access response to the application.

In an embodiment is a non-transitory computer readable medium having stored thereupon computing instructions comprising: a code segment to intercept a read request from an application running on a computing system; a code segment to determine from the intercepted read request, an identifier for a required object and a required generation number; and a code segment to determine: if the required object is not stored in a cache memory, then store in the cache memory a copy of the required object retrieved from a storage device, add metadata regarding the stored object to the cache database, the stored object metadata comprising an object generation number equal to the application generation number, add a reference to the object to a list of references to objects stored in the cache memory that are being used by the application, and return the copy of the object to the application, else if the required object is stored in the cache memory, and the stored object is of a generation number that is not less than the required generation, then add a reference to the stored object to the list of objects stored in the cache memory that are being used by the application, and return the stored object from the cache memory to the application, else if the required object is stored in the cache memory, and the stored object is of a generation number that is less than the required generation number, store in the cache memory a copy of the required object retrieved from a storage device, add metadata regarding the stored object to the cache database, the stored object metadata comprising an object generation number equal to the application generation number, add a reference to the object to the list of references to objects stored in the cache memory that are being used by the application, and return the copy of the object to the application.

In a further embodiment, the non-transitory computer readable medium having stored thereupon computing instructions wherein the code segment to add metadata regarding the stored object to the cache database further includes a code segment to: add file system metadata about a file containing the stored object, the file system metadata comprising a file identifier and a file generation number; and the non-transitory computer readable medium further includes a code segment to: before intercepting the read request, a code segment to intercept a file open request for a file object on the storage device from an application running on the computing system; obtain a file open response containing a file identifier and a file generation number for the requested file object from the storage device, determine: if the list of references to objects stored in the cache memory that are being used by the application does not contain a reference to a cached object from the file object, then return the file open response to the application, else if the file generation number contained in the file open response matches the file generation number stored as file system metadata for the cached object, then return the file open response to the application, else increment the application generation number and return the file open response to the application.

In a still further embodiment, the non-transitory computer readable medium having stored thereupon computing instructions wherein the code segment to add metadata regarding the stored object to the cache database further includes a code segment to: add storage system metadata about a data object containing the stored object, the storage system metadata comprising a data object identifier and a data object generation number; and the non-transitory computer readable medium further includes a code segment to: before intercepting the read request, intercept a data object access request for a data object on the storage device from the application running on the computing system; obtain a data object access response containing a data object identifier and a data object generation number for the requested data object from the storage device, and determine: if the list of references to objects stored in the cache memory that are being used by the application does not contain a reference to a cached object from the data object, then return the data object access response to the application, else if the data object generation number contained in the data object open response matches the data object generation number stored as storage system metadata for the cached object, then return the data object access response to the application, else increment the application generation number and return the data object access response to the application.

DETAILED DESCRIPTION OF THE INVENTION

Figure 1:
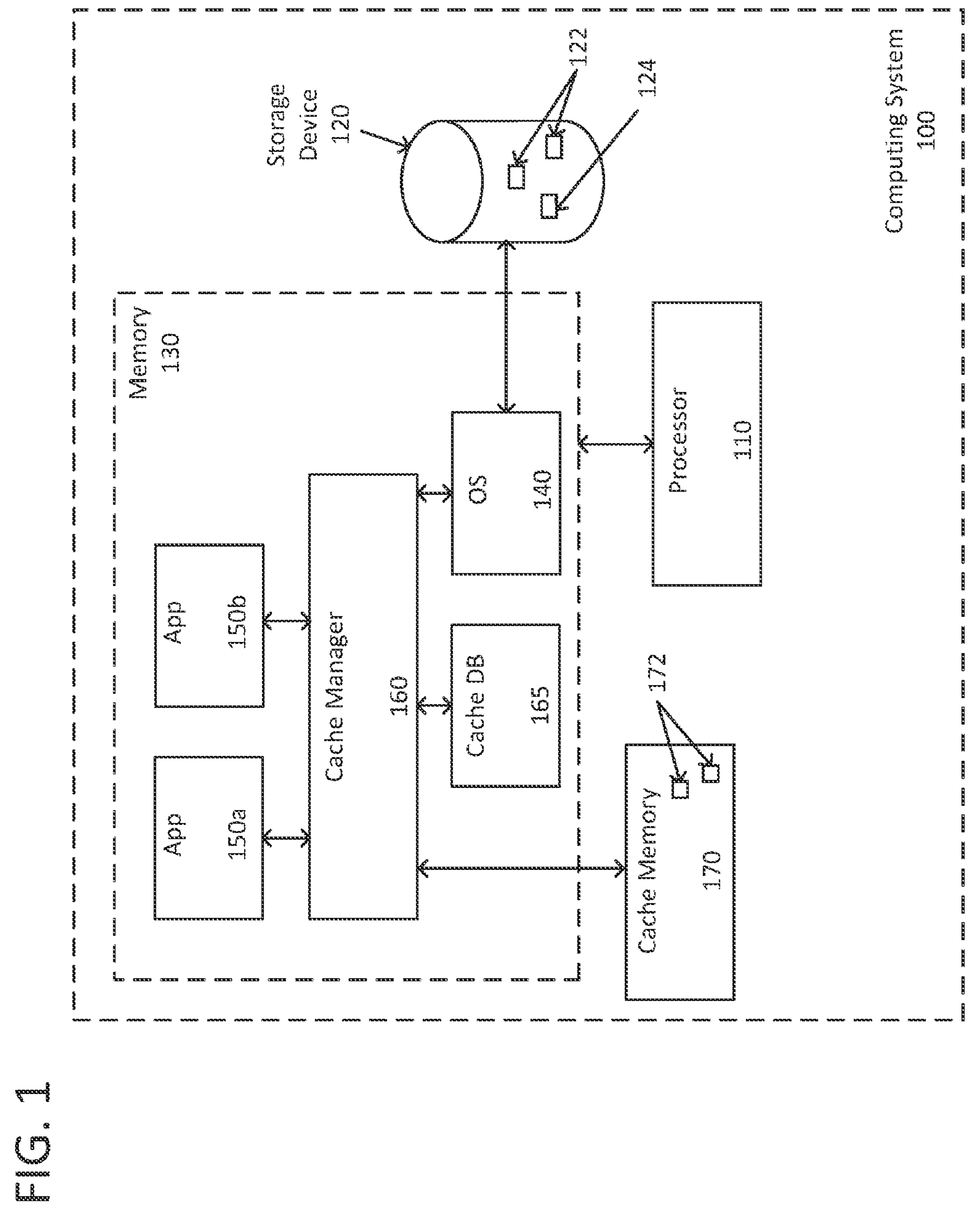
FIG. 1 is a diagram, according to an embodiment, of a computing system.

Presented herein are various embodiments of a system and method for maintaining cache coherency in a computing system.

As is known in the art, a cache manager improves the performance of applications running on a computing system by storing copies of file objects from a storage device in a cache memory so that subsequent uses of the same object are fulfilled from the faster cache memory rather than requiring that the object be fetched once more from the storage device.

In the present approach, the cache manager tracks the files an application uses and caches the objects the application reads from those files, so that it can determine if those cached objects can be used again, both as the application continues to run, and later when the application runs again.

In the present approach and as explained further elsewhere herein, the cache manager maintains objects in a cache memory on an application-by-application basis, associating with each application the files the application uses, and caching objects from those files as the application requests them. Further, the objects in cache memory associated with the application are persistent, retained in cache memory even when the application is no longer running. Similarly, a list of such objects in cache memory used by the application and maintained by the cache manager is also persistent, and retained even when the application is no longer running.

As is known in the art, before an application can read objects from or write objects to a file on a storage device, the application must first open the file through a file open request. In the present approach, the cache manager intercepts this file open request and obtains a response from the file system managing the storage device to determine if the application already has any object from the requested file in cache memory. If such an object is present in cache memory, the cache manager then determines if the file on the storage device has been modified since the copy of the object in cache memory was made. If the file has been modified, the cache manager takes an action as explained further elsewhere herein making all cached objects used by the application stale, thus causing them to be reloaded from the storage device when they are later read.

Then when an application issues a read request for an object from a file, the cache manager intercepts that read request. This results in several possible outcomes.

If the cache memory does not contain an object satisfying the read request, the cache manager obtains the requested object from the storage device, stores the object in cache memory, adds a reference to the object to the list of references to objects stored in the cache memory that are being used by the application, and returns the object to the application, thus completing the read request.

Alternatively, if the cache manager finds an object in cache memory which satisfies the read request, the cache manager first determines if the found object in cache memory is still valid. If the found object is valid, a reference to the object is added to the list of references to objects stored in cache memory that are being used by the application, and the object is returned to the application, thus completing the read request. Conversely, if the found object is stale, the cache manager obtains the requested object from the storage device, stores the object in cache memory, adds a reference to the object to the list of references to objects stored in cache memory that are being used by the application, and returns the object to the application, thus completing the read request.

Turning now to FIG. 1, a diagram of a computing system 100 according to an embodiment is shown. A processor 110 is coupled to a memory 130. Also coupled to memory 130 is a storage device 120 and a cache memory 170.

Subsystems known in the art such as power supplies, detailed input/output architectures and the like are not shown for clarity. In an embodiment, processor 100 comprises one or more microprocessors; microprocessors from companies such as Intel® Corporation, Advanced Micro Devices®, IBM®, MIPS® Technologies, ARM® LTD, or microprocessors using similar architectures may be used. Single-core or multiple-core microprocessors may be used.

In an embodiment, memory 130 is a fast dynamic random access memory (DRAM) or equivalent. In an embodiment, storage device 120 is a hard disk, and is coupled to computing system 100 through one or more interfaces known in the computing arts such as Peripheral Component Interconnect (PCI), PCI Express (PCIe), Serial AT Attachment (SATA), Small Computer System Interface (SCSI), Universal Serial Bus (USB), or network attachments such as iSCSI, Fibre Channel, Serial Attached SCSI, Serial Storage Architecture (SSA), Ethernet®, Infiniband® and the like. In another embodiment, storage device 120 may be one or more of a Flash memory device, a solid-state disk (SSD), hybrid disk, hard disk, or other memory device suitable for storing files.

In an embodiment, cache memory 170 is a Flash memory device. In another embodiment, cache memory 170 may be configured using one or more volatile and/or nonvolatile memory devices such as dynamic random access memory (DRAM), PCI flash device, solid-state disks (SSD), hybrid disks, or other memory devices coupled to computing system 100 through one or more interfaces known in the computing arts. In another embodiment, cache memory 170 may be a portion of memory 130.

Memory 130 contains operating system 140, applications 150*a*, 150*b* running under operating system 140, and cache manager 160, which are computer programs containing data and instructions which are executed by processor 110.

In an embodiment, storage device 120 is a component of computing system 100, for example present in the same enclosure as processor 110 and memory 130. In an alternative embodiment, storage device 120 is external to computing system 100, such as a network attached file store.

Storage device 120 is managed by a file system, as is known in the art, and stores file objects 122. These file objects are managed by cache manager 160 as described elsewhere herein. As is known in the art, storage device 120 also contains a file database 124 of all files 122 in storage device 120. File database 124 contains a file identifier and a file generation number for each file 122 in storage device 120, and is conventionally known as file system metadata among those skilled in the art. File database 124 may be maintained by the file system which is included in, or is supported by, operating system 140. In alternative embodiments, for example where storage device 120 is a network attached file store, file database 124 may be maintained by a file system in the file store, or by another operating system managing the file store.

In an embodiment, operating system 140 is an operating system such as a Microsoft Windows® system, OSX® from Apple® Inc, a Linux® system, UNIX® system, or other operating system. In an embodiment, operating system 140 is a virtualization host hypervisor such as VMWare® ESX/ESXi from VMWare Inc or other hypervisors such as Xen from Xen.org, Kernel-based Virtual Machine (KVM) in Linux, the z/VM family of hypervisors from International Business Machines, the Oracle VM Server family from Oracle® Corporation, Citrix® XenServer, or Hyper-V from Microsoft® Corporation. As is known in the art, a hypervisor or virtual machine monitor supports running one or more virtual machines on a host system, providing a virtual operating platform to one or more guest operating systems running as virtual machines. As is known in the art, such operating systems include and/or support file systems for managing storage devices such as storage device 120.

In an embodiment of operating system 140 such as Linux, Windows, or OSX, application 150 is a program such as the Chrome® web browser from Google®, Inc., or Mathematica® from Wolfram®, Inc. Where operating system 140 is a hypervisor, application 150 is itself a virtual machine running an operating system, such as Microsoft Windows, Linux, or other operating system.

Cache manager 160 is shown as a software layer between operating system 140 and one or more applications 150. Cache manager 160 is coupled to cache memory 170. The operation of cache manager 160 is described in greater detail elsewhere herein.

In operation, the cache manager maintains cache coherency in the cache memory of the computing system by tracking the files used by an application running on the computing system, and by tracking the objects in the cache memory associated with those files as accessed by the application. The cache manager tracks the objects in the cache memory by maintaining a cache database containing an entry for each object in the cache memory.

As is understood in the computer arts, a file is a named container for objects on the storage device such as a disk drive or a file store. A file open request from an application precedes any requests by the application to read objects from the file or write objects to the file. A file open request returns a response from a file system to the application identifying the file on the storage device, and contains a file identifier and a file generation number. The file generation number is incremented each time the file is opened. A subsequent file read request returns an object from the file on the storage device.

As described in greater detail elsewhere herein, the cache manager maintains cache coherency by using file generation numbers associated with each file in the storage device to determine when files have been accessed or modified, and by using object generation numbers associated with each object in the cache memory to determine when objects in cache memory are valid and can therefore be used.

For use in the present approach and as explained further elsewhere herein, the cache manager maintains an application entry, for example in a stored table or list, for each application running on the computing system. The application entry for each application comprises an application identifier, an application generation number, and a list of references to all objects stored in the cache memory used by the application. This application entry is maintained by the cache manager and is present even when the application is no longer running.

The cache manager intercepts file open requests from an application. The cache manager passes the file open request to the file system managing the storage device, which returns a response. The cache manager uses this response to first determine if the application has an object stored in cache memory belonging to the requested file. If such an object is found, the cache manager then determines if the file on the storage device has been modified. If the cache manager determines that the file has been modified, then the found object in cache memory is no longer valid, and the cache manager, as explained further elsewhere herein, takes an action to make all cached objects used by the application stale, such that they will be reloaded from the storage device as they are later read.

Subsequently, the cache manager intercepts read requests from an application. As stated previously and explained further elsewhere herein, this results in several possible outcomes.

If the cache memory does not contain an object satisfying the read request, the cache manager obtains the requested object from disk storage, stores the object in cache memory, adds metadata regarding the stored object to the cache database, the stored object metadata comprising an object generation number equal to the application generation number, and adds file system metadata about the file containing the object, the file system metadata comprising a file identifier and a file generation number, adds a reference to the object to the list of references to objects stored in the cache memory that are being used by the application, and returns the object to the application, thus completing the read request.

Conversely, if the cache manager does find an object in cache memory which satisfies the read request, the cache manager determines if the found object in cache memory is still valid. If the found object is valid, it is returned to the application, thus completing the read request. However, if the found object is stale, the cache manager obtains the requested object from disk storage, stores the object in cache memory, adds metadata regarding the stored object to the cache database, the stored object metadata comprising an object generation number equal to the application generation number, and adds file system metadata about the file containing the object, the file system metadata comprising a file identifier and a file generation number, adds a reference to the object to the list of references to objects stored in the cache memory that are being used by the application, and returns the object to the application, thus completing the read request.

The cache manager determines whether the found object in the cache memory is valid by comparing the generation number of the object stored in the cache memory with a required generation number, as explained elsewhere herein. The result of this test determines that the object stored in the cache memory is stale and must be replaced, or that the object is valid and can be used.

The cache manager processes write requests by an application to an object in cache memory by assigning the application generation number to the object in the metadata for the object in the cache database. If no cache memory object for the write request exists, for example in the case where a file is being created, the cache manager stores an object in the cache memory for the write request, adds metadata regarding the stored object to the cache database, the stored object metadata comprising an object generation number equal to the application generation number, and adds file system metadata about the file containing the object, the file system metadata comprising a file identifier and a file generation number, and adds a reference to the object to the list of references to objects stored in the cache memory that are being used by the application.

It should be understood that an object in cache memory, through its cache database entry, retains the file generation number of the file from which the object was read, and is also given an object generation number, which is the generation number of the application which caused the object to be read from the file and stored in the cache memory. The file generation number and the object generation number are separate and distinct. The file generation number is used by the cache manager in processing intercepted file open requests to determine if the application making the file open request has objects in cache memory from the file associated with the application, and if those cached objects are valid. The object generation number is also used by the cache manager in the processing of intercepted read requests to determine if the read request made by the application can be satisfied by an object that is present in cache memory, and whether the object present in cache memory is still valid.

Figure 2:
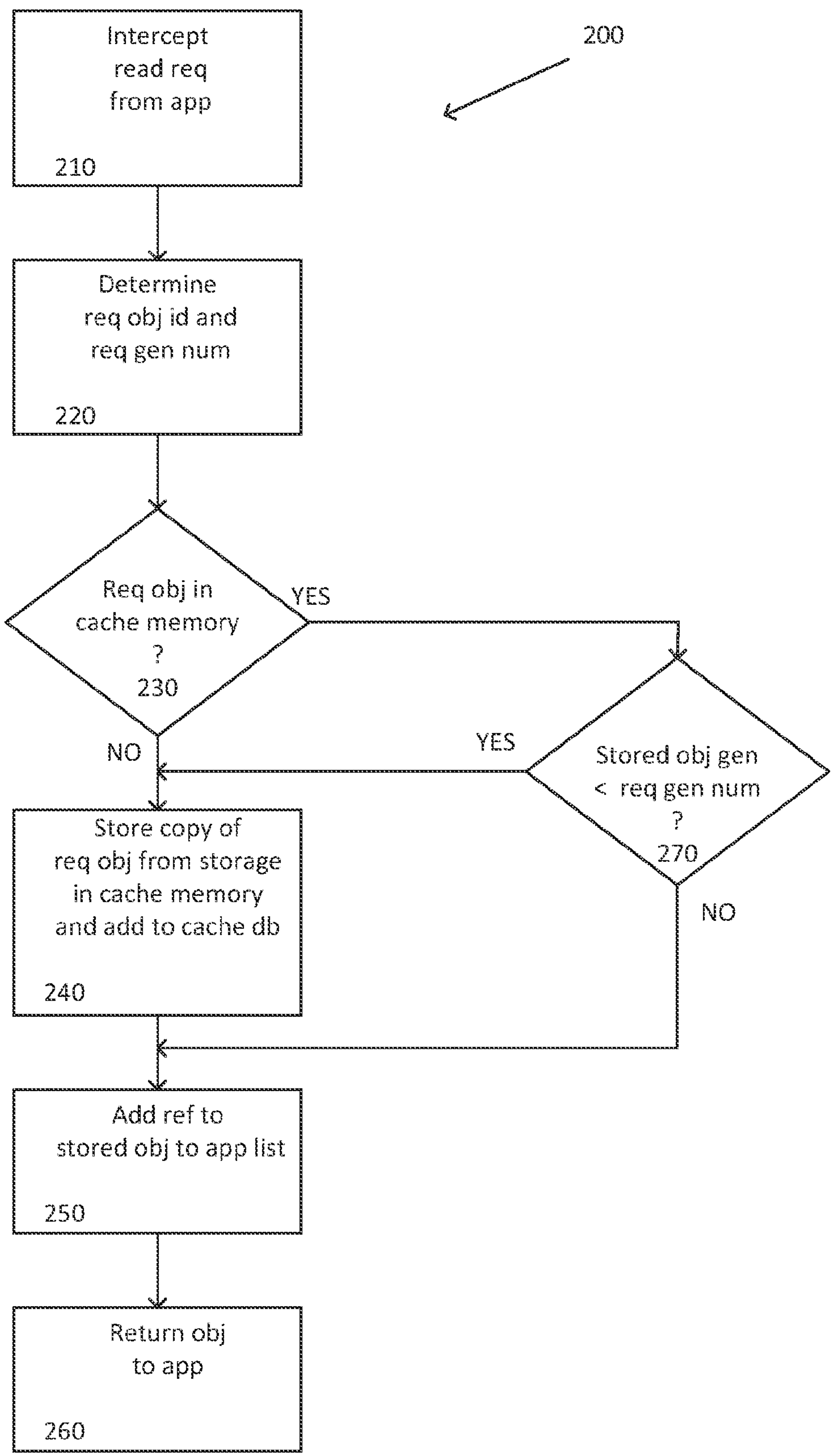
FIG. 2 is a flowchart, according to an embodiment, detailing a method of maintaining cache coherency in a cache memory by a cache manager intercepting read requests from an application.
Figure 3:
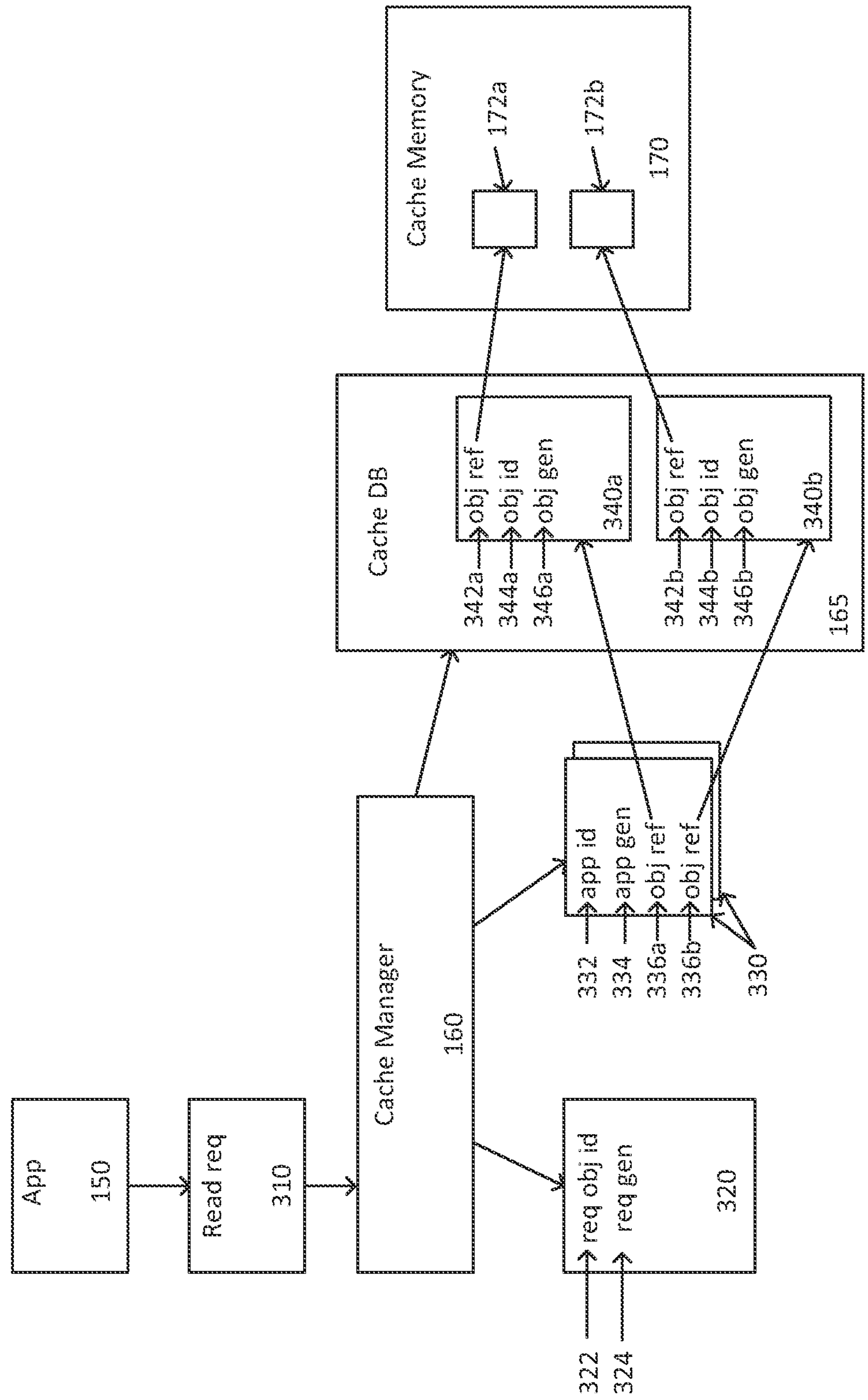
FIG. 3 is a diagram, according to an embodiment, of cache coherency management.

A flowchart detailing a method of maintaining cache coherency in a cache memory by a cache manager intercepting read requests from an application according to an embodiment is shown in FIG. 2, with a diagram of cache coherency management shown in FIG. 3, along with continued reference to FIG. 1.

In operation, cache manager 160 maintains the contents of cache memory 170, and the objects 172 stored therein by associating with each application 150 the objects 172 stored in the cache memory 170 which are used by that application 150. A generation number is associated with each application 150 and a generation number is associated with each object 172 stored in the cache memory 170.

Cache manager 160 does this through maintaining cache database 165 of entries 340, one entry for each object 172 stored in the cache memory 170. A cache database entry 340 contains an object reference 342 which points to the object 172 in cache memory 170, and metadata regarding the stored object which includes an object generation number 346 and an object identifier 344 which comprises file system metadata about the file containing the object including a file identifier and a file generation number. In an embodiment, cache manager 160 is a computer program comprising instructions and data which is present in memory 130, executed by processor 110. In an embodiment, cache database 165 may be stored in memory 130. In another embodiment, cache database 165 may be in a separate memory device, a separate process running on computing system 100, or a process running on another computing system in a distributed environment.

Cache manager 160 also maintains an application entry 330 for each application 150 running on the computing system 100. An application entry 330 contains an application identifier 332, an application generation number 334, and a list of references 336 to cache database entries 340 representing the objects 172 stored in the cache memory 170 in use by the application 150.

In an embodiment, application entries 330 are persistent, maintained by cache manager 160 even when the running application 150 exits and is no longer running. These application entries 330 may be stored in memory 130, with copies stored in storage device 120. Maintaining application entries 330 as persistent accelerates restarting an application 150 by providing a list of objects stored in the cache memory 170 that the application 150 previously used. Cache database 165 and cache database entries 340 are also persistent.

In an embodiment, the method of maintaining cache coherency in cache memory 170 by cache manager 160 deals with the following cases:

(1) The required object is not stored in the cache memory, (2) The required object is stored in the cache memory and is stale, and (3) The required object is stored in the cache memory and is valid.

The steps of method 200 for maintaining cache coherency in a cache memory will first be discussed in general, and then examples will be discussed for each case.

In step 210, cache manager 160 intercepts a read request 310 from an application 150 to operating system 140. In an embodiment, cache manager 160 intercepts read requests 310 to operating system 140 using means known in the art. As an example, Linux operating systems provide filter driver software interfaces for file system cache managers and device drivers which can be used for such interceptions.

In step 220, cache manager 160 determines an identifier for the required object and the required generation number from the intercepted read request 310.

In an embodiment, the required object identifier 322 is determined from read request 310, and in one embodiment is the file identifier from the file system managing storage device 120 of FIG. 1. Such file identifiers are implementation specific. As an example, a file identifier in a Linux-based file system could be a file inode number which identifies a particular disk file on the storage device. Similar file identifiers are present in file systems used and/or supported by Microsoft® Windows and Apple® Macintosh OS X operating systems. In a networked environment, a file identifier combined with a network identifier of the network storage system, such as a network name or address, may be used. In an embodiment, the required generation number 324 is equal to the application generation number 334.

In step 230, cache manager 160 determines if the required object is already stored in the cache memory 170. In an embodiment, cache manager 160 searches cache database entries 340 of cache database 165 for objects stored in the cache memory 170. If a cache entry 340 is found which has an object identifier 344 corresponding to the required object identifier 322, this means the required object is stored in the cache memory 170, and the method continues with step 270. Otherwise, this means the required object is not stored in the cache memory 170 and the method continues with step 240.

In step 240, the required object is read from the storage device, a copy of the object is stored in the cache memory, and an entry for the object is added to the cache database. In an embodiment, the object with required object identifier 322 is read from storage device 120. A copy of the object read from storage device 120 is stored in the cache memory 170. The cache manager 160 adds a cache database entry 340 for the stored object to cache database 165, the entry 340 containing a reference 342 to the object in cache memory 170, the object identifier 344, and stored object metadata comprising an object generation number 346 equal to the application generation number 334. The object identifier 344 comprises file system metadata about the file containing the object, including a file identifier and a file generation number returned from storage device 120.

In step 250, a reference to the object stored in the cache memory is added to the list of objects stored in the cache memory in use by the application. In an embodiment, cache manager 160 adds a cache database reference (db ref) 336 to the list of references to objects stored in the cache memory 170 that are being used by the application in application entry 330 which is a reference to the cache database 165 entry 340 corresponding to the object.

In step 260, the object is returned to the application, thus completing the read request. In an embodiment, data from the object 172 stored in the cache memory 170 is returned to application 150, thus completing the read request.

In step 270, following the determination in step 230 that the required object is stored in the cache memory, the generation number of the stored object is compared to the required generation number. If the stored object generation number is less than the required generation number, then the object stored in the cache memory is stale and must be reloaded, which is performed by continuing with step 240 as has been described. Conversely, if the stored object generation number is equal to the required generation number, the object is valid and the method continues with step 250, as has been described, adding the object stored in the cache memory to the list of objects stored in the cache memory that are in use by the application, and returning the object to the application.

Turning now to FIGS. 4 through 7, detailed operation of the method according to an embodiment is presented for the previously enumerated cases of:

(1) The required object is not stored in the cache memory, (2) The required object is stored in the cache memory but is stale, and (3) The required object is stored in the cache memory and is valid.

In each of the following discussions, the initial state is the same: an application 150 with an application identifier 332 equal to 20, an application generation number 334 equal to 6, and one cache database reference (db ref) **336*a* on the list of references to objects stored in cache memory 170 that are being used by the application; this cache database reference 336*a* is to cache database entry 340*a* with an object identifier 344*a* equal to 40, and metadata including an object generation number 346*a*** equal to 6.

Case (1):

FIG. **4*a* is a diagram, according to an embodiment, showing cache coherency management dealing with a required object not stored in the cache memory. Cache manager 160 in processing read request 320 has determined the required object identifier 322 of 80, and the required generation number 324 of 6. Cache manager 160 searches cache database 165 for an entry having the identifier for the required object of 80 and determines that no such object is present in cache database 165, thus, the required object is not present in the cache memory 170**.

Figure 4A:
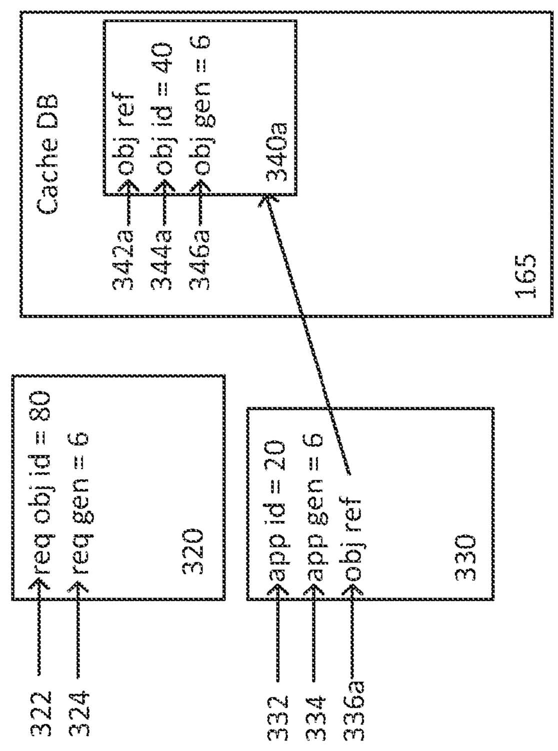
FIG. 4*a* is a diagram, according to an embodiment, showing cache coherency management dealing with a required object not stored in the cache memory.
Figure 4B:
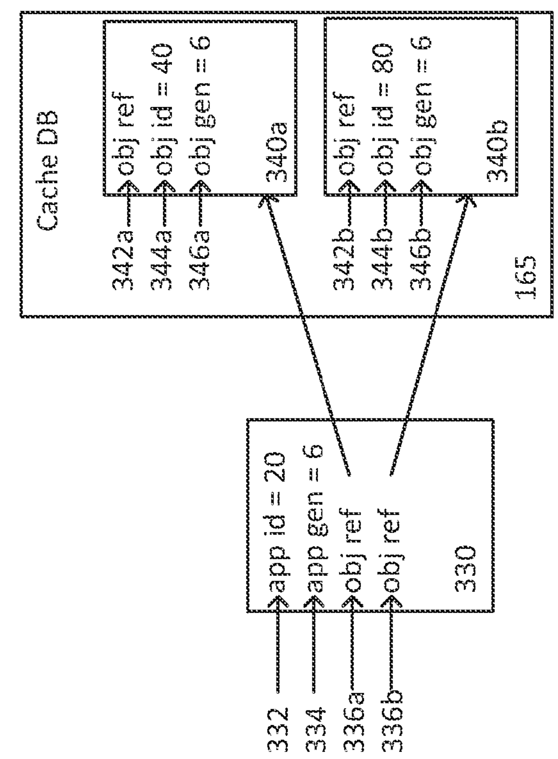
FIG. 4*b* is a diagram, according to an embodiment, showing cache coherency management dealing with a required object not stored in the cache memory, after adding the required object to the application.

FIG. 4*b* is a diagram, according to an embodiment, showing cache coherency management dealing with a required object not stored in the cache memory, after adding the required object to the application. The required object with the identifier 322 of 80 was read from storage device 120 and a copy of the object stored in the cache memory 170. Cache manager 160 created a new cache database entry 340*b* for the stored object, with a reference 342*b* to the object in cache memory 170, and the object identifier of 80 from the required object identifier 322. Metadata including the object generation number 346*b* was set to the application generation number 334, and is equal to 6. File system metadata about the file containing the object comprising a file identifier and a file generation number returned from storage device 120 is stored as object identifier 344. A cache database reference 336*b* to this cache database entry 340*b* has been added to the list of references to objects stored in the cache memory 170 that are being used by the application 330. The object in cache memory 170 was returned to the application.

Figure 5B:
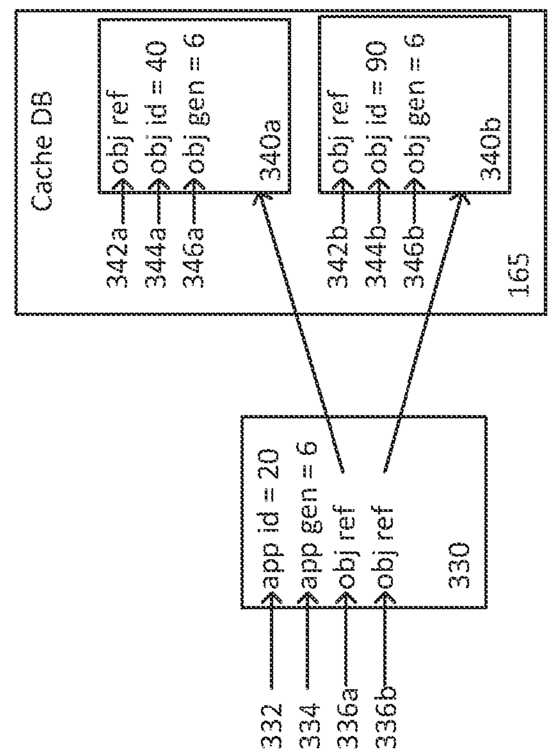
FIG. 5*b* is a diagram, according to an embodiment, showing cache coherency management dealing with a required object stored in the cache memory but is stale, after updating the object.
Figure 5A:
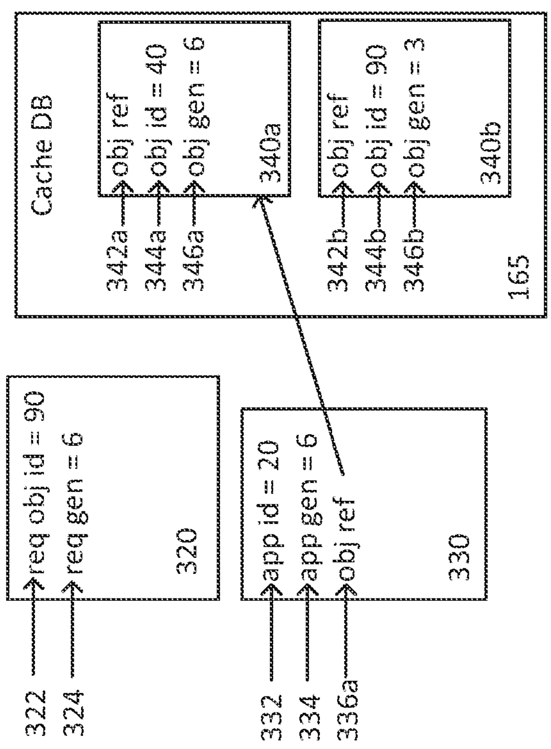
FIG. 5*a* is a diagram, according to an embodiment, showing cache coherency management dealing with a required object stored in the cache memory but is stale.

Case (2):

FIG. 5*a* is a diagram, according to an embodiment, showing cache coherency management dealing with a stale object. As shown, cache manager 160 in processing read request 320 has determined the required object identifier 322 of 90, and the required generation number 324 of 6. Cache manager 160 locates cache database entry 340*b* which has a matching object identifier 344*b* of 90. Comparing the object generation number of stored object 340*b*, which is 3, with the required generation number 324 from read request 320, which is 6, determines that the object in cache memory 170 associated with cache database entry 340*b* is stale and must be reloaded from storage device 120.

FIG. 5*b* is a diagram, according to an embodiment, showing cache coherency management dealing with a required object stored in the cache memory but is stale, after updating the object. A new copy of the object was read from storage device 120 and a copy of the object stored in the cache memory 170. A new cache database entry 340*b* was created with the object identifier 344*b* of 90 from the required object identifier 322, object reference 342*b* pointing to the stored object in cache memory 170, and metadata including object generation number 346*b* equal to the application generation number 334, which is 6. File system metadata about the file containing the object comprising a file identifier and a file generation number returned from storage device 120 is stored as object identifier 344. A cache database reference 336*b* to this cache entry 340*b* has been added to the list of references to objects stored in the cache memory in use by the application 330. The object was returned to the application.

It should be noted that the present approach does not require eager purging of stale objects stored in cache memory. Rather, the present approach insures that only valid objects in cache memory are used. Stale objects stored in cache memory may be purged asynchronously, based on specified times, on time intervals, on events such as cache utilization, or on other system events, as would be understood by one of skill in the art based on the present teachings.

Figure 6A:
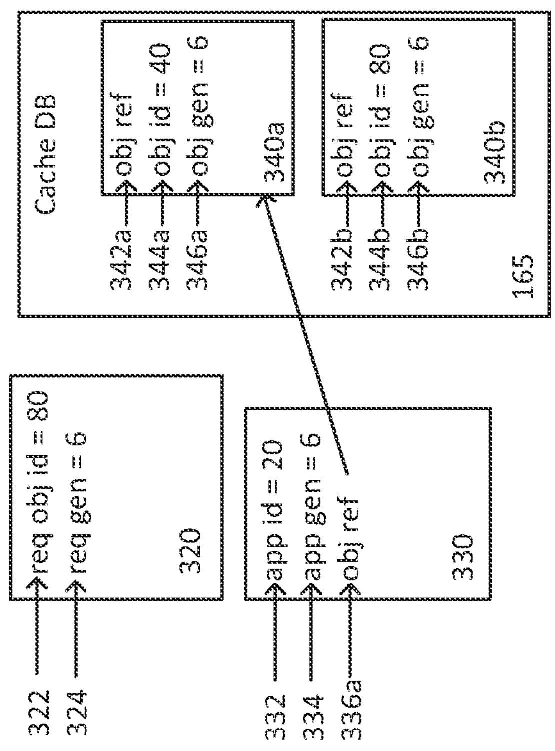
FIG. 6*a* is a diagram, according to an embodiment, showing cache coherency management dealing with a required object stored in the cache memory and valid.

Case (3):

FIG. 6*a* is a diagram, according to an embodiment, showing cache coherency management dealing with a valid object. As shown, cache manager 160 in processing read request 320 has determined the required object identifier 322 of 80, and the required generation number 324 of 6. Cache manager 150 locates entry 340*b* in cache database 165 which has a matching object identifier 344*b* of 80. Comparing the metadata object generation number 346*b* of entry 340*b*, which is 6, with the required generation number 324 from read request 320, which is 6, determines that the object in cache memory associated with entry 340*b* is valid.

Figure 6B:
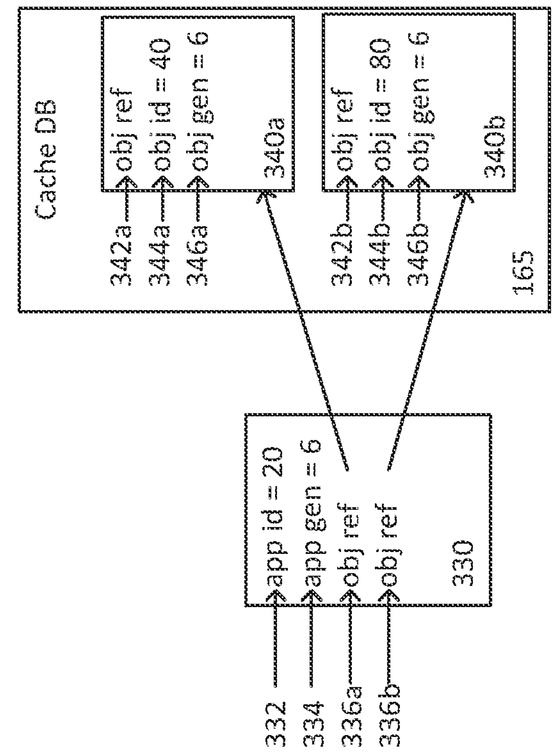
FIG. 6*b* is a diagram, according to an embodiment, showing cache coherency management dealing with a required object stored in the cache memory and valid, after adding the object to the application.
Figure 7:
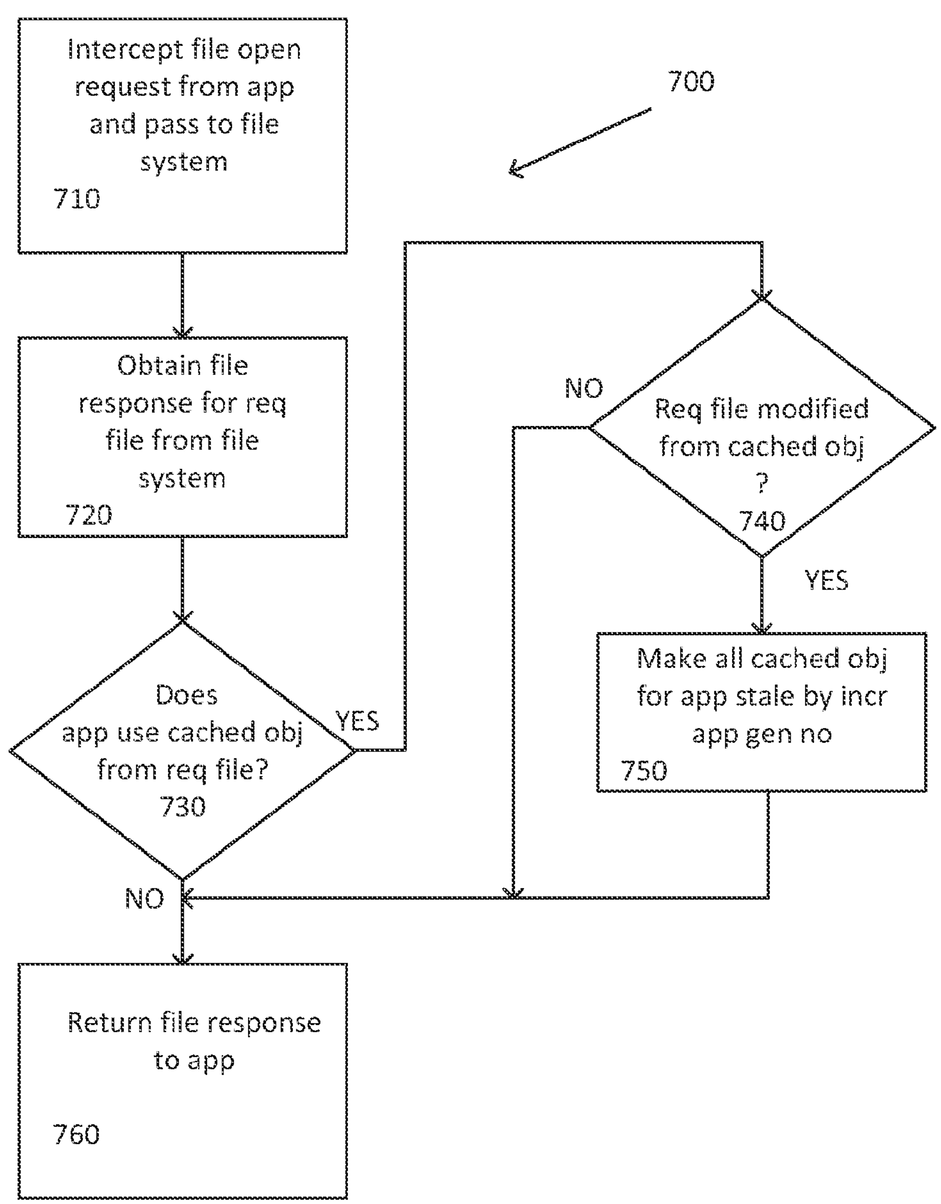
FIG. 7 is a flowchart, according to an embodiment, further detailing a method of maintaining cache coherency in a cache memory by a cache manager intercepting file open requests from an application.

FIG. 6*b* is a diagram, according to an embodiment, showing cache coherency management dealing with a required object stored in the cache memory and valid, after adding the object to the list of objects in use by the application. A cache database reference 336*b* to cache database entry 340*b* has been added to the list of references to objects stored in the cache memory 170 that are being used by the application 330, and the object was returned to the application as previously described herein.

Now with reference to the flowchart of FIG. 7 and again with reference to FIGS. 1 and 3, a method of maintaining cache coherency in a cache memory by a cache manager intercepting file open requests from an application according to an embodiment will be described.

In step 710, the cache manager intercepts a file open request from an application and passes that file open request to the file system. In an embodiment, application 150*a* of FIG. 1 issues a file open request to open a file object 122 in storage device 120. Cache manager 160 intercepts the file open request and passes the request to a file system managing storage device 120.

In step 720, a file open response for the requested file is obtained from the file system. In an embodiment, the file system managing storage device 120 returns the file open response for the requested file. The file open response includes file system metadata comprising a file identifier and a file generation number for the file object 122 from file database 124 for the requested file to cache manager 160. It should be noted, as is known in the art, that the file system managing storage device 120 returns the file open response, and then increments the file generation number for that file in file database 124 to track use of the file by applications in the computing system.

In step 730, the cache manager determines if the application has used any cached object from the requested file. In an embodiment, cache manager 160 determines that an application has used a cached object from the requested file by determining if the list of references to objects stored in cache memory 170 that are being used by the application contains a reference to a cached object which has file system metadata with a object identifier 344 matching the file identifier returned in the file open response.

If no such cached object has been found, the returned file open response is returned to the application in step 760.

Conversely in step 740, the cache manager determines if the requested file has been modified in comparison to the cached object located in step 730. In an embodiment, cache manager 160 compares the file generation number contained in the file open response to the file generation number stored as file system metadata, which was stored with object identifier 344 of the cache database entry 340 found in step 730. The cache manager determines that the file has been modified if the returned file generation number is greater than the cached object file generation number plus a predetermined value. In an embodiment where the file generation number maintained by the file system managing storage device 120 is incremented on a file open request, this predetermined value is equal to 1. In an additional embodiment where the file generation number is also incremented on a file close request, this predetermined value is equal to 2.

As an example, a first application issues a file open request for a file F. The file open response contains a file generation number of 30. The file open request causes the file system managing storage device 120 to increment its copy of the file generation number to 31. Objects read from this file and stored in cache memory will contain the file generation number of 30 as part of the object identifier 344 in cache database entry 340 for the object. Assume the first application exits, and then restarts at some later time. When the first application once again issues a file open request for file F, the cache manager receives the file open response now containing a file generation number of 31. Because of the above described cache memory file object storage, the cache manager locates a cached object for this file with a file generation number of 30 as part of the object identifier 344. The found cached object is still valid, because the returned file generation number of 31 is within the found cached object generation number of 30, plus the predetermined value of 1, thus indicating that the file has not been accessed or modified by other applications. In contrast, assume that before the first application restarted, a second application issued a file open request for file F. This file open request causes the file system managing storage device 120 to increment the file generation number of file F to 32. Subsequently when the first application restarts and once again issues a file open request for file F, the file generation number of 32 is returned. The cache manager locates a cached object for this file with a file generation number of 30. Since the object generation number, 30, is not within the predetermined value of 1 from the file generation number of 32, the cache manager determines that file F has been modified and makes all cached objects associated with the application stale by incrementing the application generation number, so that they will be reloaded when they are later read. Similarly, in an additional embodiment where the file generation number is also incremented on a file close request, as a file F is opened with a file open request, accessed through read and write requests, and closed through a file close request or when the application exits and stops running, the file system managing storage device 120 will increment the file generation number for the file twice, once for the file open request, and once for the file close request. In such an embodiment, the predetermined value used in the comparison to test of a file has been modified on a file open request is 2.

In an embodiment, if the file has not been modified, the method continues with step 760, returning the file open response to the application.

In step 750, because the requested file has been modified as determined in step 740, the cached object, and all cached objects used by the application are made stale, forcing those objects to be reloaded from the storage device when later accessed. In an embodiment, cache manager 160 increments application generation number 334 in the application entry 330 for the application. Because the application generation number has been incremented, all cached objects associated with the application will be determined to be stale when such objects are next accessed through an intercepted read request as described previously herein, and will be reloaded from storage device 120.

In step 760, the file open response returned from the file store is returned to the application. In an embodiment, the file open response returned by the file system managing storage device 120 is returned to the application.

The system and methods described herein are equally applicable to the simple computing system shown in FIG. 1, as well as to a more complex computing environment such as a distributed computing environment.

Figure 8:
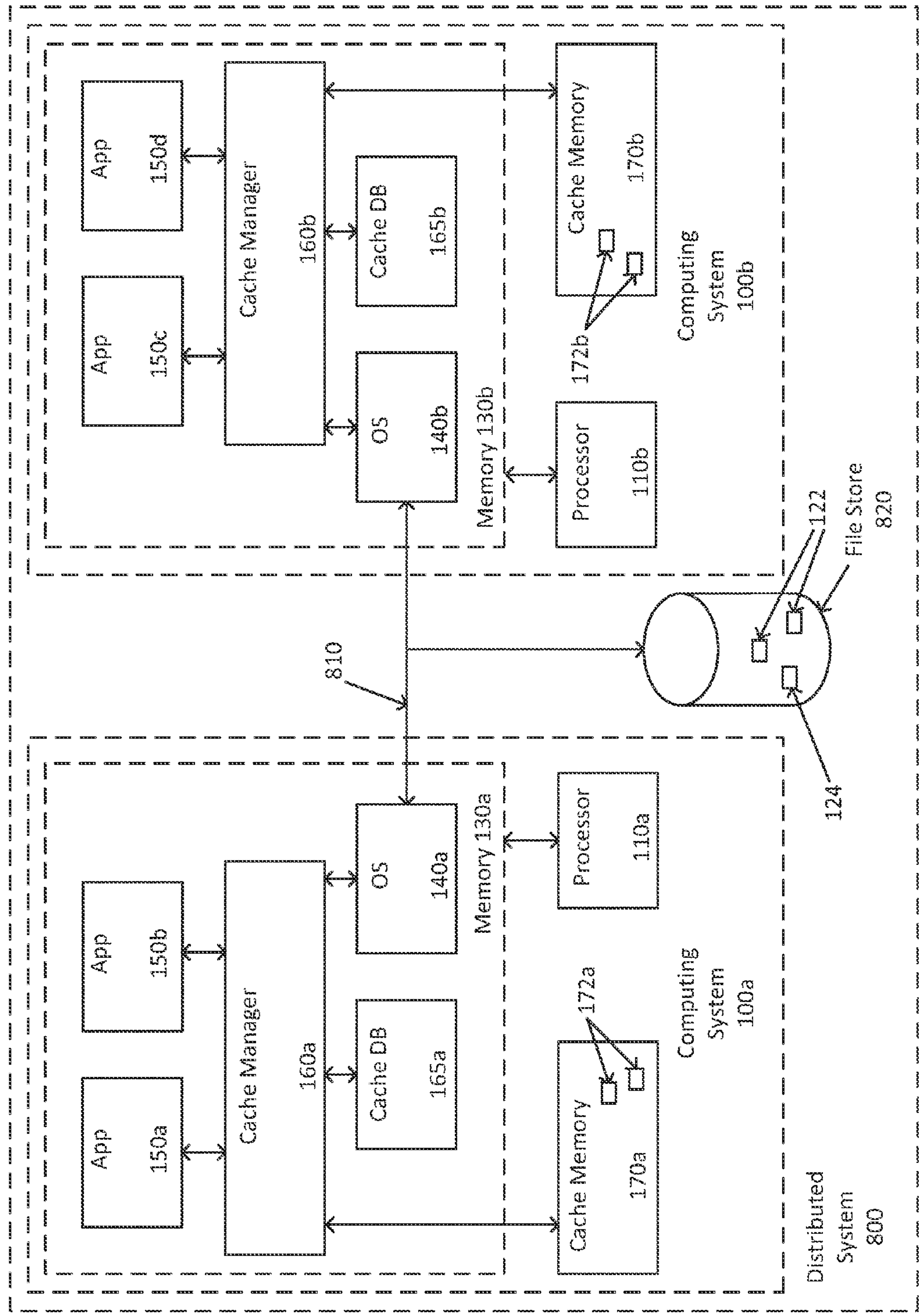
FIG. 8 is a diagram, according to an embodiment, of a distributed computing environment.

FIG. 8 is a diagram of a distributed computing environment or system 800 according to an embodiment. Distributed system 800 contains two or more computing systems, such as computing systems 100*a* and 100*b*, sharing a common file store 820 to perform the function of storage device 120 of FIG. 1. File store 820 is shared by computing systems 100*a* and 100*b* through network 810, which also interconnects computing systems 100*a* and 100*b*.

In an embodiment, file store 820 is a network storage system such as a network-attached storage (NAS) system, or a storage-area network (SAN). Both NAS and SAN storage are capable of providing high capacity redundant storage to client systems. Such storage systems are available from companies such as NetApp®, EMC®, HP®, IBM®, and many others. In an embodiment, network 810 is a suitable network for coupling computing systems 100 to file store 820. Such networks include Ethernet, Fibre Channel, InfiniBand, and others.

In an embodiment, operating system 140 in distributed system 800 is a hypervisor. As is known in the art, a hypervisor or virtual machine monitor supports running one or more virtual machines on a host system, providing a virtual operating platform to one or more guest operating systems running as virtual machines.

Where operating system 140 is a hypervisor, an application 150 is itself a virtual machine running an operating system, such as Microsoft Windows, Linux, or other operating system.

In a distributed environment such as distributed system 800, file store 820 is shared among multiple computing systems 100, and multiple applications 150. With such sharing, because applications running in separate computing systems 100 may be using the same object from file store 820, cache memories 170 in the separate computing systems 100 are maintained together. As such, cache managers 160*a* and 160*b* synchronize operations. In one embodiment, cache managers 160*a* and 160*b* keep cache databases 165*a* and 165*b* synchronized using techniques known to the database arts. As an example, when cache manager 160*a* updates an entry 340 in cache database 165*a*, that update is sent to cache manager 160*b* to make the corresponding update. When cache manager 160*b* intercepts a read request from an application such as application 150*c*, that read request is also sent to cache manager 160*a* to determine if the required object is present in cache 170*a*. Cache memories on multiple computing systems on a network can be maintained as one cache, for example, cache memory 170*a* and cache memory 170*b* used by cache managers 160*a* and 160*b* as a single large cache.

In such a distributed environment, an application may move among hosts, for example running at one time on computing system 100*a*, at another time on computing system 100*b*, and at a later time on computing system 100*a* again. As an application runs on a host, the local cache of that host, for example cache 170*a* in computing system 100*a*, stores objects used by the application. As previously described herein, the contents of the cache are persistent, remaining in the cache after the application has stopped running. As an application runs on one host, caching objects in that host's cache, then stops running and runs on another host, caching objects in the other host's cache, and then stops running on that other host and runs again on the first host, the cache manager must insure that previously cached objects used by the application are still valid. This is performed as described previously herein through the file open process.

As an example in a distributed environment such as that shown in FIG. 8, assume an application app1 that is running on host 1, for example computing system 100*a*, issues a file open request for file F stored on file store 820. As described previously herein, file store 820 returns the file generation number of file F to app1, for example 41, and increments the file generation number to 42. App1 running on host 1 uses file F, with objects from file F copied to cache memory 170*a* of host 1. Assume that app1 then quits running and at a later time begins running on host 2, for example, computing system 100*b*, and issues a file open request for file F. File store 820 returns the file generation number, 42, to app1 now running on host 2, and increments the file generation number to 43. At some later time, app1 running on host 2 then quits running. At a further later time, app1 begins running once more on host 1. Then, app1 running on host 1 issues a file open request for file F, and file store 820 returns the file generation number of 43. As a result of this sequence of operations, the previously cached objects from file F in the cache memory 170*a* of host 1 have a file generation number of 41. The cache manager determines that file F has been modified because the returned file generation number for file F is 43 and the file generation number for the previously cached object from file F is 41, which is outside the valid range, in this example, 41 or 42 because the file generation number is incremented when file store 820 processes the file open request as described previously herein. As a result, the cache manager then forces all cached objects associated with the application to be reloaded when they are next read by incrementing the application generation number of app1.

It is to be noted that while the present approach has been described as operating on files and parts of files stored on a file-based data storage device or a file store, the present approach is also applicable to caching of data objects stored on a storage device managed by an object storage system. In file-based storage, files are stored in hierarchical structures such as directories. When an application program reads from a disk file, the file contents are stored as one or more objects in cache memory. As known in the art, in an object storage system variable-sized data objects are stored in a flat address space rather than in a hierarchical structure. Such object storage systems are available from Dell® Inc. as Dell Object Store, StorageGrid from NetApp® Inc, and others. When an application reads from a data object stored on a storage device managed by an object storage system, the data object contents are stored as an object in cache memory. The management of objects stored in cache memory is handled in essentially the same manner under the present approach whether the objects are read from a file or a data object as will now be explained.

In a file-based data storage device or a file store as described herein, file system metadata is typically maintained on each file. This file system metadata comprises a file identifier and a file generation number. Similarly in an object storage system, storage system metadata is typically maintained on each data object. This storage system metadata comprises a data object identifier and a data object generation number. In the present approach, this storage system metadata is processed in the same manner as file system metadata, with the data object identifier replacing the file identifier, and the data object generation number replacing the file generation number.

In an object storage system, an application must issue a data object access request before a read request is issued. In the present approach, the data object access request is handled in the same manner as a file open request as described elsewhere herein, with the data object access request intercepted by the cache manager and passed to the object storage system. The object storage system returns a data object access response which contains a storage system metadata comprising the data object identifier and the data object generation number. The object storage system increments the data object generation number.

In the same manner as described elsewhere herein for the file open process, the cache manager uses the returned storage system metadata which includes the data object identifier to determine if the list of references to objects in use by the application contains a reference to a cached object from the data object on the object storage system. If no such cached object is found the data object access response is returned to the application.

If a cached object is found, the cache manager determines if the data object on the object storage system has been modified in comparison to the found cached object. This is done in the same manner as described with respect to the file open process, comparing the data object generation number stored with the cached object as storage system metadata to the data object generation number contained in the data object access response. Based on this comparison, if the data object has not been modified, the data object access response is returned to the application.

If the data object has been modified, all cached objects associated with the application are made stale. The application generation number is incremented, which causes all cached objects associated with the application to be reloaded when they are next read. The data object access response is returned to the application.

In such an embodiment, the processing of read requests is handled as has been previously described elsewhere herein, with the substitution of storage system metadata for file system metadata.

The disclosed method and apparatus is equally applicable to simple computing systems as well as more complex computing environments, and overcomes the known centralized cache coherency bottlenecks and single point of failure issues.

It should be understood that the approach described herein maintains cache coherency through the cache manager intercepting application file open requests and read requests and the tracking of file generation numbers and cache object generation numbers in cached objects used by the application. The modification of a file on a storage device with respect to objects in cache memory is detected through the use of file generation numbers and the interception by the cache manager of file open requests.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. In a computing system having a cache memory and a storage device, a cache coherency method comprising:

intercepting, by a cache manager running on the computing system, a read request from an application running on the computing system;

determining, by the cache manager from the intercepted read request, an identifier for a required object and a required generation number; and determining by the cache manager:

if the required object is not stored in the cache memory, then storing in the cache memory a copy of the required object retrieved from the storage device, adding metadata regarding the stored object to the cache database, the stored object metadata comprising an object generation number equal to an application generation number, adding a reference to the stored object to a list of references to object stored in the cache memory that are being used by the application, and returning the copy of the object to the application, else if the required object is stored in the cache memory, and the stored object is of a generation number that is not less than the required generation number, then adding a reference to the stored object to the list of references to objects stored in the cache memory that are being used by the application, and returning the stored object from the cache memory to the application, else if the required object is stored in the cache memory, and the stored object is of a generation number that is less than the required generation number, then storing in the cache memory a copy of the required object retrieved from the storage device, adding metadata regarding the stored object to the cache database, the stored object metadata comprising an object generation number equal to the application generation number, adding a reference to the stored object to a list of references to objects stored in the cache memory that are being used by the application, and returning the copy of the object to the application;

wherein adding metadata regarding the stored object to the cache database further comprises adding file system metadata about a file containing the stored object, the file system metadata comprising a stored object file identifier and a stored object file generation number;

and, prior to the step of intercepting the read request:

intercepting, by the cache manager running on the computing system, a file open request for a file object on the storage device from the application running on the computing system;

obtaining, by the cache manager, a file open response containing a requested object file identifier and a requested object file generation number for the requested file object from the storage device, and determining by the cache manager:

if the list of references to objects stored in the cache memory that are being used by the application does not contain a reference to a cached object from the file object, then returning the file open response to the application, else if the requested object file generation number contained in the file open response matches the stored object file generation number stored as file system metadata for the cached object, then returning the file open response to the application, else incrementing the application generation number and returning the file open response to the application.

2. The method of claim 1 wherein the required generation number is the application generation number.

3. The method of claim 1 where the storage device is coupled to the computing system over a computer network.

4. The method of claim 1 where the cache memory is distributed over a plurality of computing systems in a network.

5. The method of claim 4 where the cache memory distributed over the plurality of computing systems in a network is maintained as one cache.

6. The method of claim 4 where the cache manager is distributed over a plurality of computing systems in a network.

7. The method of claim 1 where the application is a virtual machine.

8. In a computing system having a cache memory and a storage device, a cache coherency method comprising:

intercepting, by a cache manager running on the computing system, a read request from an application running on the computing system;

determining, by the cache manager from the intercepted read request, an identifier for a required object and a required generation number; and determining by the cache manager:

if the required object is not stored in the cache memory, then storing in the cache memory a copy of the required object retrieved from the storage device, adding metadata regarding the stored object to the cache database, the stored object metadata comprising an object generation number equal to an application generation number, adding a reference to the stored object to a list of references to object stored in the cache memory that are being used by the application, and returning the copy of the object to the application, else if the required object is stored in the cache memory, and the stored object is of a generation number that is not less than the required generation number, then adding a reference to the stored object to the list of references to objects stored in the cache memory that are being used by the application, and returning the stored object from the cache memory to the application, else if the required object is stored in the cache memory, and the stored object is of a generation number that is less than the required generation number, then storing in the cache memory a copy of the required object retrieved from the storage device, adding metadata regarding the stored object to the cache database, the stored object metadata comprising an object generation number equal to the application generation number, adding a reference to the stored object to a list of references to objects stored in the cache memory that are being used by the application, and returning the copy of the object to the application;

wherein adding metadata regarding the stored object to the cache database further comprises adding storage system metadata about a data object containing the stored object, the storage system metadata comprising a requested data object identifier and a requested data object generation number;

and the method further comprising, prior to the step of intercepting the read request:

intercepting, by the cache manager running on the computing system, a data object access request for a data object on the storage device from the application running on the computing system;

obtaining, by the cache manager, a data object access response containing a stored data object identifier and a stored data object generation number for the requested data object from the storage device, and determining by the cache manager:

if the list of references to objects stored in the cache memory that are being used by the application does not contain a reference to a cached object from the data object, then returning the data object access response to the application, else if the requested data object generation number contained in the data object access response matches the cached stored data object generation number stored as data object metadata for the cached object, then returning the data object access response to the application, else incrementing the application generation number and returning the data object access response to the application.

9. A system for maintaining cache coherency in a computing system comprising:

a cache memory;

a cache database;

a storage device; and a cache manager running on the computing system, the cache manager configured to:

intercept a read request from an application running on the computing system;

determine from the intercepted read request an identifier for a required object and a required generation number; and determine:

if the required object is not stored in the cache memory, then store in the cache memory a copy of the required object retrieved from the storage device, add metadata regarding the stored object to the cache database, the stored object metadata comprising an object generation number equal to an application generation number, add a reference to the stored object to a list of references to objects stored in the cache memory that are being used by the application, and return the copy of the object to the application, else if the required object is stored in the cache memory, and the stored object is of a generation number that is not less than the required generation number, then add a reference to the stored object to the list of references to objects stored in the cache memory that are being used by the application, and return the stored object from the cache memory to the application, else if the required object is stored in the cache memory, and the stored object is of a generation number that is less than the required generation number, then store in the cache memory a copy of the required object retrieved from the storage device, add metadata regarding the stored object to the cache database, the stored object metadata comprising an object generation number equal to the application generation number, add a reference to the stored object to the list of references to objects stored in the cache memory that are being used by the application, and return the copy of the object to the applications;

wherein the cache manager is configured to add metadata regarding the stored object to the cache database by being further configured to add file system metadata regarding the stored object to the cache database, the file system metadata comprising a stored object file identifier and a stored object file generation number;

and wherein the cache manager is further configured to, before intercepting the read request:

intercept a file open request for a file object on the storage device from the application running on the computing system;

obtain a file open response containing a requested object file identifier and a requested object file generation number for the requested file object from the storage device, and determine:

if the list of references to objects stored in the cache memory that are being used by the application does not contain a reference to a cached object from the file object, then return the file open response to the application, else if the requested object file generation number contained in the file open response matches the stored object file generation number stored as file system metadata for the cached object, then return the file open response to the application, else increment the application generation number and return the file open response to the application.

10. The system of claim 9 where the cache manager is configured to set the required generation number to the application generation number.

11. The system of claim 9 where the storage device is coupled to the computing system via a computer network.

12. The system of claim 9 wherein the storage device is located in the computing system.

13. The system of claim 9 where the application is a virtual machine.

14. A system for maintaining cache coherency in a computing system comprising:

a cache memory;

a cache database;

a storage device; and a cache manager running on the computing system, the cache manager configured to:

intercept a read request from an application running on the computing system;

determine from the intercepted read request an identifier for a required object and a required generation number; and determine:

if the required object is not stored in the cache memory, then store in the cache memory a copy of the required object retrieved from the storage device, add metadata regarding the stored object to the cache database, the stored object metadata comprising an object generation number equal to an application generation number, add a reference to the stored object to a list of references to objects stored in the cache memory that are being used by the application, and return the copy of the object to the application, else if the required object is stored in the cache memory, and the stored object is of a generation number that is not less than the required generation number, then add a reference to the stored object to the list of references to objects stored in the cache memory that are being used by the application, and return the stored object from the cache memory to the application, else if the required object is stored in the cache memory, and the stored object is of a generation number that is less than the required generation number, then store in the cache memory a copy of the required object retrieved from the storage device, add metadata regarding the stored object to the cache database, the stored object metadata comprising an object generation number equal to the application generation number, add a reference to the stored object to the list of references to objects stored in the cache memory that are being used by the application, and return the copy of the object to the application;

wherein the cache manager is configured to add metadata regarding the stored object to the cache database by being further configured to add storage system metadata regarding the stored object to the cache database, the storage system metadata comprising a data object identifier and a data object generation number;

and wherein where the cache manager is further configured to:

before intercepting the read request, intercept a data object access request for a data object on the storage device from the application running on the computing system;

obtain a data object access response containing a data object identifier and a data object generation number for the requested data object from the storage device, and determine:

if the list of references to objects stored in the cache memory that are being used by the application does not contain a reference to a cached object from the data object, then return the data object access response to the application, else if the data object generation number contained in the data object open response matches the data object generation number stored as storage system metadata for the cached object, then return the data object access response to the application, else increment the application generation number and return the data object access response to the application.

15. A non-transitory computer readable medium having stored thereupon computing instructions comprising:

a code segment to intercept a read request from an application running on a computing system;

a code segment to determine from the intercepted read request, an identifier for a required object and a required generation number; and a code segment to determine:

if the required object is not stored in a cache memory, then store in the cache memory a copy of the required object retrieved from a storage device, add metadata regarding the stored object to the cache database, the stored object metadata comprising an object generation number equal to an application generation number, add a reference to the object to a list of references to objects stored in the cache memory that are being used by the application, and return the copy of the object to the application, else if the required object is stored in the cache memory, and the stored object is of a generation number that is not less than the required generation, then add a reference to the stored object to the list of references to objects stored in the cache memory that are being used by the application, and return the stored object from the cache memory to the application, else if the required object is stored in the cache memory, and the stored object is of a generation number that is less than the required generation number, store in the cache memory a copy of the required object retrieved from a storage device, add metadata regarding the stored object to the cache database, the stored object metadata comprising an object generation number equal to the application generation number, add a reference to the object to the list of references to objects stored in the cache memory that are being used by the application, and return the copy of the object to the application;

wherein the code segment to add metadata regarding the stored object to the cache database further includes a code segment to:

add file system metadata about a file containing the stored object, the file system metadata comprising a stored object file identifier and a stored object file generation number;

and the non-transitory computer readable medium further comprises a code segment to, before intercepting the read request:

intercept a file open request for a file object on the storage device from the application running on the computing system;

obtain a file open response containing a requested object file identifier and a requested object file generation number for the requested file object from the storage device, and determine:

if the list of references to objects stored in the cache memory that are being used by the application does not contain a reference to a cached object from the file object, then return the file open response to the application, else if the requested object file generation number contained in the file open response matches the stored object file generation number stored as file system metadata for the cached object, then return the file open response to the application, else increment the application generation number and return the file open response to the application.

16. The non-transitory computer readable medium of claim 15 where the code segment to determine from the intercepted read request a required generation number comprises a code segment to set the required generation number to the application generation number.

17. The non-transitory computer readable medium of claim 15 where the application is a virtual machine.

18. A non-transitory computer readable medium having stored thereupon computing instructions comprising:

a code segment to intercept a read request from an application running on a computing system;

a code segment to determine from the intercepted read request, an identifier for a required object and a required generation number; and a code segment to determine:

if the required object is not stored in a cache memory, then store in the cache memory a copy of the required object retrieved from a storage device, add metadata regarding the stored object to the cache database, the stored object metadata comprising an object generation number equal to an application generation number, add a reference to the object to a list of references to objects stored in the cache memory that are being used by the application, and return the copy of the object to the application, else if the required object is stored in the cache memory, and the stored object is of a generation number that is not less than the required generation, then add a reference to the stored object to the list of references to objects stored in the cache memory that are being used by the application, and return the stored object from the cache memory to the application, else if the required object is stored in the cache memory, and the stored object is of a generation number that is less than the required generation number, store in the cache memory a copy of the required object retrieved from a storage device, add metadata regarding the stored object to the cache database, the stored object metadata comprising an object generation number equal to the application generation number, add a reference to the object to the list of references to objects stored in the cache memory that are being used by the application, and return the copy of the object to the application;

wherein the code segment to add metadata regarding the stored object to the cache database further includes a code segment to add storage system metadata about a data object containing the stored object, the storage system metadata comprising a data object identifier and a data object generation number;

and the non-transitory computer readable medium further includes a code segment to, before intercepting the read request:

intercept a data object access request for a data object on the storage device from the application running on the computing system;

obtain a data object access response containing a data object identifier and a data object generation number for the requested data object from the storage device, and determine:

if the list of references to objects stored in the cache memory that are being used by the application does not contain a reference to a cached object from the data object, then return the data object access response to the application, else if the data object generation number contained in the data object open response matches the data object generation number stored as storage system metadata for the cached object, then return the data object access response to the application, else increment the application generation number and return the data object access response to the application.

* * * * *